US012473838B2

(12) United States Patent
Garfunkel et al.

(10) Patent No.: US 12,473,838 B2
(45) Date of Patent: Nov. 18, 2025

(54) APPARATUS AND METHOD FOR MAINTAINING GAS PRESSURE IN AN ELECTROLYZER USING AN ELECTRIC GENERATOR CONFIGURED TO CAPTURE KINETIC ENERGY OF ELECTROLYSIS PRODUCTS

(71) Applicant: Marine Dolphin Enterprises, LLC, Scarsdale, NY (US)

(72) Inventors: Alan J. Garfunkel, Scarsdale, NY (US); Samuel A. Thompson, Greenwich, CT (US); Bruce Santos, Dresher, PA (US); Klaus Fahrländer, Baden-Württemberg (DE)

(73) Assignee: MARINE DOLPHIN ENTERPRISES, LLC, Scarsdale, NY (US)

( * ) Notice: Subject to any disclaimer, the term of this patent is extended or adjusted under 35 U.S.C. 154(b) by 586 days.

(21) Appl. No.: 17/973,816

(22) Filed: Oct. 26, 2022

(65) Prior Publication Data
US 2023/0129611 A1 Apr. 27, 2023

Related U.S. Application Data

(60) Provisional application No. 63/271,755, filed on Oct. 26, 2021.

(51) Int. Cl.
F01D 15/10 (2006.01)
C25B 1/04 (2021.01)
F01D 5/02 (2006.01)
F02C 7/36 (2006.01)

(52) U.S. Cl.
CPC ............ F01D 15/10 (2013.01); C25B 1/04 (2013.01); F02C 7/36 (2013.01); F01D 5/02 (2013.01); F05D 2220/76 (2013.01); F05D 2260/4031 (2013.01); F05D 2260/42 (2013.01); F05D 2270/02 (2013.01); F05D 2270/301 (2013.01); Y02E 60/36 (2013.01)

(58) Field of Classification Search
None
See application file for complete search history.

(56) References Cited

U.S. PATENT DOCUMENTS

| | | | |
|---|---|---|---|
| 3,754,147 | A | 8/1973 | Hancock et al. |
| 4,442,665 | A | 4/1984 | Fick et al. |
| 4,490,232 | A | 12/1984 | Lapeyre |
| 6,543,229 | B2 | 4/2003 | Johansson |
| 6,579,638 | B2 | 6/2003 | Brassard |

(Continued)

FOREIGN PATENT DOCUMENTS

| | | |
|---|---|---|
| CA | 2510954 A1 | 1/2007 |
| EP | 4336024 A1 | 3/2024 |
| WO | 2017191222 A1 | 11/2017 |

Primary Examiner — Louis J Rufo
(74) Attorney, Agent, or Firm — David Guerra

(57) ABSTRACT

Systems and methods are described herein for monitoring gas pressure within an electrolysis system and maintaining gas pressure using an electric generator to capture kinetic energy of compressed hydrogen and/or oxygen gases as they are produced by an electrolyzer. The generator utilizes a rotating apparatus, such as a fan or turbine, to capture the energy of the gases and generate electricity. Any electricity produced by the generator is fed back to the electrolyzer to supplement its energy requirements.

19 Claims, 4 Drawing Sheets

(56) References Cited

U.S. PATENT DOCUMENTS

| | | |
|---|---|---|
| 6,907,735 B2 | 6/2005 | Wolff et al. |
| 7,075,189 B2 | 7/2006 | Heronemus |
| 7,097,748 B2 | 8/2006 | Duffy et al. |
| 7,550,113 B2 | 6/2009 | Speranza et al. |
| 11,105,313 B2 | 8/2021 | Perez |
| 11,795,902 B2 | 10/2023 | Perez |
| 2008/0050622 A1 | 2/2008 | French |
| 2009/0068508 A1 | 3/2009 | Martin |
| 2010/0258449 A1 | 10/2010 | Fielder |
| 2017/0033381 A1 | 2/2017 | Reilly |
| 2017/0145570 A1 | 5/2017 | Herold et al. |
| 2017/0175277 A1* | 6/2017 | von Olshausen ......... C25B 1/04 |
| 2019/0120200 A1* | 4/2019 | Perez ...................... F03B 13/10 |
| 2020/0028401 A1 | 1/2020 | Takahashi et al. |
| 2024/0026852 A1 | 1/2024 | Perez |

* cited by examiner

APPARATUS AND METHOD FOR MAINTAINING GAS PRESSURE IN AN ELECTROLYZER USING AN ELECTRIC GENERATOR CONFIGURED TO CAPTURE KINETIC ENERGY OF ELECTROLYSIS PRODUCTS

REFERENCE TO RELATED APPLICATION

This application claims priority and benefit from U.S. Provisional Patent Application 63/271,755, filed Oct. 26, 2021, the contents and disclosure of the application is incorporated herein by reference in its entirety.

BACKGROUND

The present invention relates to the use of a generator configured to produce electricity from compressed gases to maintain gas pressure within an electrolysis system. Specifically, the invention would be integrated into a hydrogen generation system capable of producing hydrogen gas and oxygen gas from fresh water or seawater at ground level or submerged into a body of water. The system would have the capability of electrolyzing either freshwater or seawater.

SUMMARY

Climate change is one of the largest threats facing the world today. Extreme weather events such as floods, hurricanes, fires and heat waves amongst others are becoming more and more common as the atmosphere continues to be polluted by greenhouse gases generated from the burning of fossil fuels. Therefore, the planet must be provided with alternatives to polluting energy sources and nations with high emissions must transition away from the use of polluting fossil fuels.

Achieving net-zero emissions by the mid to late $21^{st}$ century has become of the highest importance to the developing and developed world. An integral part of these ambitious goals are carbon-free fuels and energy sources. Renewables, such as solar and wind, are able to provide green electricity, however, the electricity generated is not always able to be stored and available for when the consumer needs to use the electricity, and these energy sources alone cannot quickly, efficiently and at low cost replace fossil fuels.

Hydrogen is a fuel that has the ability to store energy for later use. Hydrogen has many advantages, such as not producing any pollution (its byproduct is water), its ability to be compressed into an energy dense fuel, and its potential to democratize energy availability over the world. Furthermore, hydrogen can store energy as an alternative to large scale batteries or other methods of storing electricity. The development of a strong hydrogen economy would free nations currently dependent on other countries for fossil fuel, and if integrated with renewable energy sources would greatly reduce the carbon footprint of any nation utilizing the fuel.

Current hydrogen production technologies produce greenhouse gases since most hydrogen is produced using carbon-based feedstocks, or require very pure water (an increasingly scarce resource), with both being inefficient when converting external energy into hydrogen. A majority of hydrogen produced in the United States is made using steam-methane reforming, a process that uses a carbon-based fuel—methane—and produces carbon dioxide—a greenhouse gas. On the other hand, processes that do not produce greenhouse gases, such as pure-water electrolysis, are limited in their efficiency in converting electricity to hydrogen and have additional energy demands to purify the water for feedstock. Further loses of efficiency are observed when this hydrogen must be compressed, stored, and delivered to users. Harnessing the kinetic energy of gases produced from the electrolyzer will increase the efficiency of the overall system.

An underwater hydrogen electrolysis system capable of electrolyzing freshwater or seawater would solve many of the existing problems in generating hydrogen. An underwater system would not produce greenhouse gases in its operation, would not necessarily require pure water, and would increase its operational efficiency through capturing the kinetic energy of the produced gases. Such a system would have the capability to electrolyze freshwater or seawater.

Therefore, a need exists within the electrolysis field for a generator capable of generating electricity from gases produced by an electrolyzer, particularly if such gasses are produced at an inherently high pressure. Such system would be able to generate its own electricity to allow for a greater energy efficiency of the system.

The present invention comprises a generator utilized within an electrolysis system to improve the energy efficiency of the system by harnessing the energy of the produced hydrogen and/or oxygen high pressure gases. The generator comprises a device that creates energy from the differential pressures created as a byproduct of water electrolysis, or from the differential pressures created as a byproduct of high-pressure water electrolysis. An electrolyzer housed in a chamber at depth in water, will have its anode section connected to one pipe and its cathode section connected to a second pipe. The pipes will extend upwards outside of the chamber housing the electrolyzer through water-tight seals and will carry the oxygen and hydrogen byproducts created by the electrolysis process to the water's surface.

A water electrolysis process contained within a chamber, or within a pressurized chamber, will separately produce hydrogen ($H_2$) and oxygen ($O_2$) gases which will be either dissolved in the aqueous solution or solutions used for the electrolysis process, or it will separately produce such gases in their natural gaseous forms. In either case, differential pressures will be produced as a byproduct of the electrolysis process due to the formation of lower density hydrogen ($H_2$) and oxygen ($O_2$) gases or aqueous solutions at the electrolysis cathode or anode, relative to the density of the adjacent aqueous solution, or solutions, of the electrolysis chamber. The difference in densities will create a difference in aqueous solution or gas pressure which will cause the lower density hydrogen ($H_2$) and oxygen ($O_2$) aqueous solutions or gases to flow away from the electrolysis chamber provided the chamber has an exiting pipe or pipes, and the opposite end of the pipe or pipes is at a lower pressure than the chamber pressure.

Additional differential gas pressures can be observed if electrolysis is conducted in a high-pressure environment, such on the bottom of a sea-bed, with the gases produced being slightly greater than the high-pressure environment. Given that gases are produced ($H_2$ and $O_2$), with minimal gravitational effects on the gas pressure from bottom (e.g., 10,000 feet) to top (sea-level) within the connected piping, it is deduced that 300 bar will be provided by the system at sea-level (approximately 1 bar). With the capture of both the $H_2$ and $O_2$ gas-pressure energies, it has been estimated that such a system could contribute up to 25% of an electrolyzer's electricity demands. This is based on the compressor (inverse of gas turbine) energy demands, with a highly conservative 50% system efficiency. At 300 bar, roughly 35 kW may be achieved for a 30 Nm3/hr gas flow, or nearly 6 kW per Kg of $H_2$. With the proportionally equivalent volume of $O_2$ gas, of which an additional 3 kW is estimated, calculates to a total of 9 kW per Kg of $H_2$ produced.

Energy, in the form of electricity, is captured from the product of hydrogen ($H_2$) and oxygen ($O_2$) aqueous solutions or gases through the pipe or pipes by including a turbine generator, or several turbine generators, within the pipe or pipes, or at either end of the pipe or pipes. Within one or both of the two pipes, there may be one or more generators, which, if more than one, will be placed in the pipes in series. The generators may be powered by rotors which will spin from the force of the hydrogen and oxygen gas moving upwards through the pipes. Before each generator, the pipe may narrow to constrict the flow of gas and increase the force of the gas turning the rotors and powering the generators. In that case, the diameter of the pipe would widen again after each generator.

Systems and methods are described herein for monitoring gas pressure utilizing a generator within an electrolysis system and maintaining gas pressure using an electric generator to capture kinetic to improve the energy efficiency of the system by harnessing the energy of compressed hydrogen and/or oxygen gases as they are produced by an electrolyzer. Gas pressure of at least one gaseous product is monitored, during electrolysis, at a gas outflow port of an electrolyzer. If the gas pressure has reached a threshold pressure, the at least one gaseous product is released from the gas outflow port. The kinetic energy of the released gas is captured using a rotatable member positioned downstream from the gas outflow port. The rotatable member, which may be, for example, a fan or turbine, is mechanically coupled to an electric generator. The rotatable member is configured to rotate in response to the gas released from the electrolyzer, and the rotation causes the electric generator to produce electricity. A power management system manages power from the electric generator and at least one external power source to provide electricity to the electrolyzer. Power may be provided to the electrolyzer from more than one power source simultaneously.

In some embodiments, a transmission is interposed between the rotatable member and the electric generator. For example, the rotatable member is mechanically coupled to the input shaft of the transmission and the generator is driven by the output shaft of the transmission. A gear ratio for the transmission may be selected and applied to the transmission to control the rotational speed of the turbine and/or control the amount of electricity produced by the electric generator. Control of the turbine rotational speed can also be used to control and maintain pressures within the electrolyzer.

In some embodiments, electricity from the electric generator is transmitted to a battery bank. The battery bank is then charged using the electricity from the electric generator. The battery bank may be used as a supplemental power source for the electrolyzer.

Additional rotatable members (e.g., fans or turbines) may be positioned downstream from one another. Each rotatable member may be coupled to a different electric generator. The configuration of each rotatable member, such as blade pitch angle, may be controlled to increase or decrease the rotational speed of each rotatable member.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
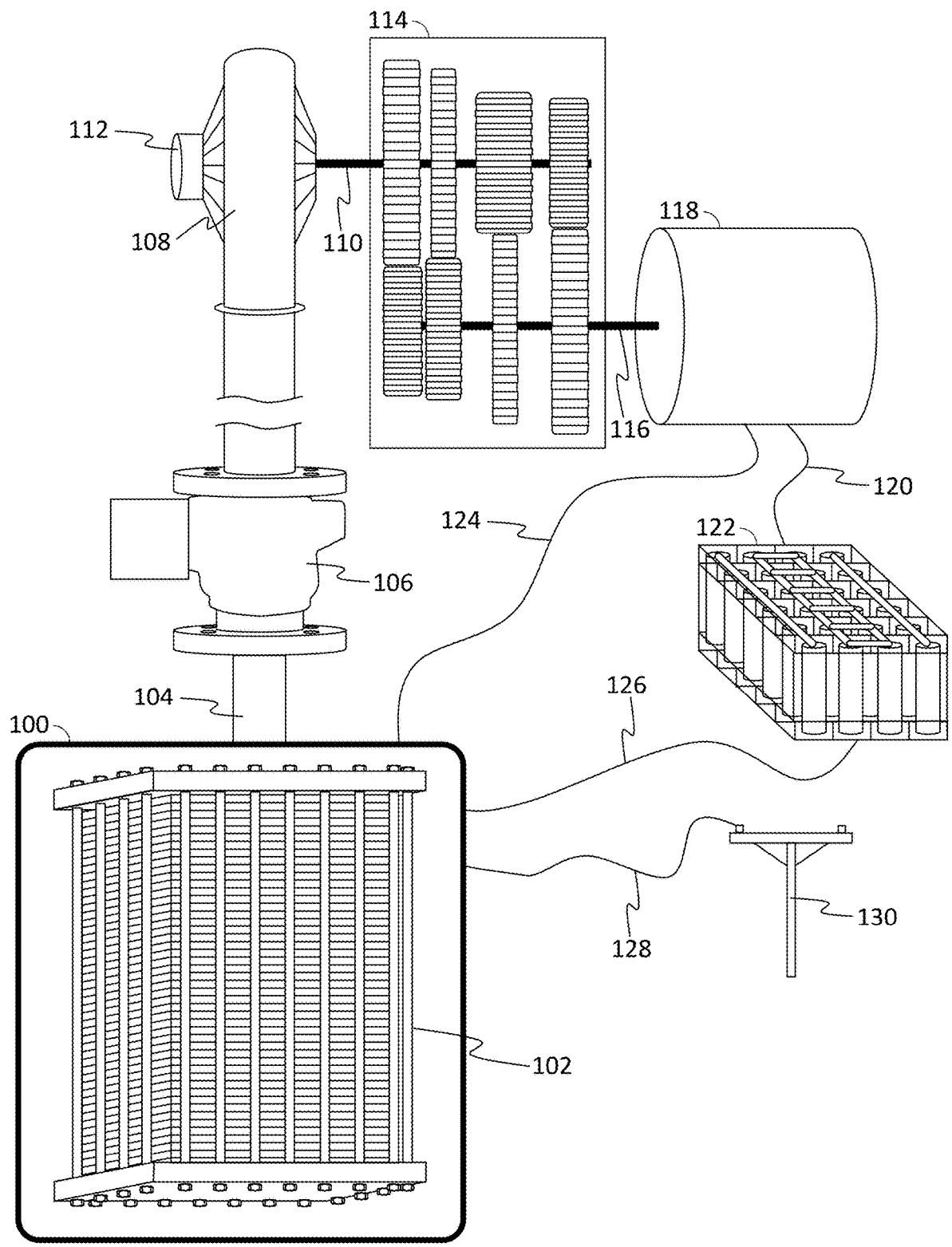
FIG. 1 shows an example of an apparatus for creating electrical energy from differential pressures of water electrolysis byproducts, in accordance with some embodiments of the disclosure.

FIG. 1 shows an example of an apparatus for creating electrical energy from differential pressures of water electrolysis byproducts, in accordance with some embodiments of the disclosure. A pressure chamber or other gastight vessel 100 may house electrolyzer 102. Vessel 100 may be located in either a freshwater or saltwater environment and may be placed at any suitable water depth. Water may be drawn into or otherwise allowed to enter vessel 100. As the water contacts or flows through electrolyzer 102, hydrogen ($H_2$) and oxygen ($O_2$) are generated. At least one gas outflow pipe 104 may be used to direct these gaseous products from vessel 100 to another location. The hydrogen product may be directed to a hydrogen storage tank or compression facility for later use in powering hydrogen-fueled systems or manufacturing hydrogen fuel cells.

Oxygen gas, which need not be separately stored for later uses, may be directed through gas outflow pipe 104 to pressure valve 106. Pressure valve 106 may be calibrated or electronically controlled to allow gas to escape only once the gas has reached a particular pressure. When that pressure is reached, pressure valve 106 open to allow the gas through. Pressure value 106 may remain open of a fixed time, or until a set minimum pressure is reached before closing again and allowing more gas pressure to build up. The buildup of pressure ensures that the electrolyzer continues to operate in an optimal environment by balancing against water pressure at an inlet to the electrolyzer. This avoids damage to the electrolyzer from water pushing up through the electrolyzer's separating membrane, which is a common component of any electrolyzer. High pressure gas accumulation pushes back on the deep-sea pressure of water at the inlet.

After passing through pressure value 106, the gas is directed to turbine 108. As the gas flow through turbine 108, the pressure of the gas rotates turbine 108, which causes shaft 110 to rotate. The gas then vents from turbine 112 to a lower pressure environment (e.g., atmospheric pressure). Shaft 110 may be an input shaft of transmission 114, which may be selectably geared to control the rotational speed of output shaft 116. Output shaft 116 is coupled to electric generator or alternator 118. The rotation of output shaft 116 drives electric generator 118 to generate electricity. In some embodiments, shaft 110 is connected directly to electric generator 118. Electricity generated by electric generator 118 may be transmitted, via electrical connection 120, to battery bank 122 for storage. Electricity may be transmitted 124 from electric generator 118 to electrolyzer 102 to drive further electrolysis, or may be transmitted 126 from battery bank 122. Addition to electricity may be transmitted 128 from another source, such as power grid 130, to electrolyzer 102 to supplement electricity provided by electric generator 118 or battery bank 122.

In some embodiments additional fans or turbines may be positioned downstream of turbine 108, with each additional fan or turbine being connected to a separate electrical generator. All electrical generators may then be connected to battery bank 122 and/or electrolyzer 100.

Figure 2:
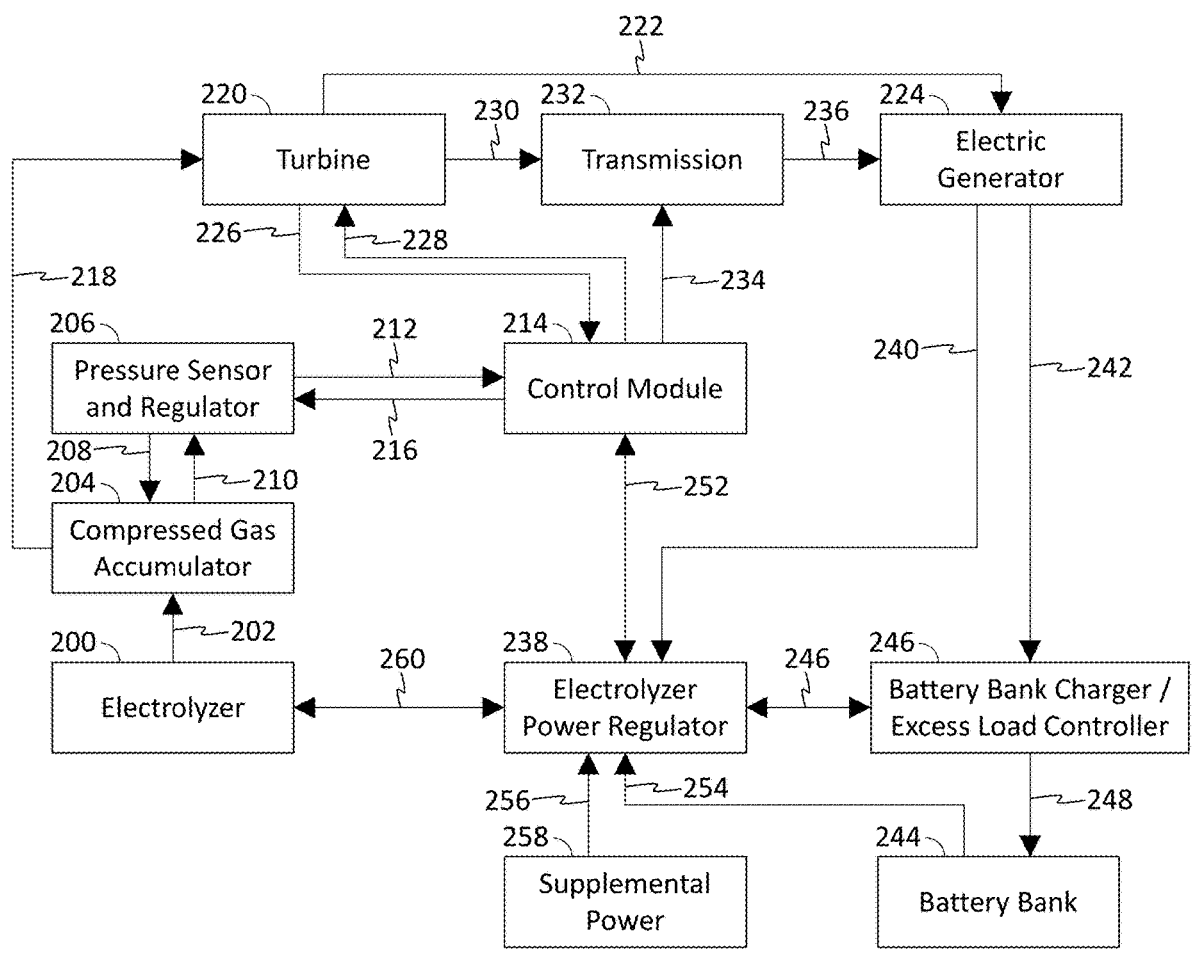
FIG. 2 is a block diagram show components of, and interactions between, an apparatus for creating electrical energy from differential pressures of water electrolysis byproducts, in accordance with some embodiments of the disclosure.

FIG. 2 is a block diagram show components of, and interactions between, an apparatus for creating electrical energy from differential pressures of water electrolysis byproducts, in accordance with some embodiments of the disclosure. An electrolyzer 200 produces compressed gas, which flow 202 from electrolyzer 200 to accumulate in compressed gas accumulator 204. Pressure sensor and regulator 206 monitors and controls gas pressures in compressed gas accumulator 204 for both system safety and optimization. Pressure sensor and regulator monitors 208 pressure of at least one gas in compressed gas accumulator 204. Gases exert pressure 210 on pressure sensor and regulator 206. Pressure sensor and regulator 206 transmits 212 a signal to control module 214. Control module 214 may be a processor or other type of controller. Control module 214 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control module 214 receives the signal from pressure sensor and regulator 206 and compares the current pressure at compressed gas accumulator 204 to a threshold pressure. The threshold pressure may be calibrated based on the materials and/or construction of electrolyzer 200 or compressed gas accumulator 204, to the extent that compressed gas accumulator 204 is physically separated from electrolyzer 200. In some embodiments, compressed gas accumulator 204 is integral to electrolyzer 200 and may be located at or combined with a gas outflow port through which gaseous products from electrolysis may be released from electrolyzer 200. If control module 214 determines that the current pressure has reached or exceeded the threshold pressure, control module 214 transmits 216 a signal instructing pressor sensor and regulator 206 to release the gas from compressed gas accumulator 204. For example, pressure sensor and regulator 206 may include a solenoid valve which may be opened in response to the signal received from control module 214. In some embodiments, pressure sensor and regulator 206 may not rely on control module 214 to release the gas when the pressure reaches or exceeds the threshold pressure. This may be for safety reasons, as control module 214 may be susceptible to electronic interference, circuit pathway degradation, or other factors that may cause control module 214 to fail or prevent an instruction from control module 214 from reaching pressure sensor and regulator 206.

Once released, the compressed gas flows 218 directly to turbine 220, from which is then vents to lower pressure atmosphere. The force used to turn the turbine or fan is greatly influenced by the pressure differential between the compressed gas entering the turbine or fan, and the atmospheric pressure the gas will subsequently be vented to. As the compressed gas flows through turbine 220, turbine 220 rotates. The rotational energy of turbine 220 is transmitted 222, through mechanical linkage, to electric generator 224, where the rotational energy is used to generate electricity. In some embodiments, turbine 220 reports 226 its rotational speed (e.g., revolutions per minute), to control module 214. To produce a desired amount of electricity at electric generator 224, control module 214 may increase or decrease the rotational speed of turbine 220. For example, an angle, or pitch, of one or more fins or blades of turbine 220 relative to a plane of rotation of the turbine may be adjustable. Control module 214 may instruct 228 turbine 220 to adjust the pitch of the fins or blades to increase or decrease the rotational speed of turbine 220. For example, if the compressed gas is at a higher pressure, the pitch of the fins or blades may be adjusted to be more shallow so as not to overdrive the turbine, while the pitch may be adjusted to be steeper is the compressed gas is at a lower pressure in order to achieve maximum rotation. In some embodiments, the threshold pressure may be adjusted by control module 214 to achieve a desired rotation speed of turbine 220 as the gas passes through it.

In some embodiments, turbine 220 is not directly mechanically connected to electric generator 224, but rather is mechanically connected to the input shaft of a transmission gearbox. Rotational energy is then transmitted 230 from turbine 220 to transmission 232. Control module 214 may select and apply a gear ratio to transmission 232 to either increase or decrease the rotational speed of the output shaft of transmission 232 which is then coupled to electric generator 224. Transmission 232 may have a fixed set of available gear ratios, or may be a continuously variable transmission, thereby allowing control module 214 to more finely select and apply gear ratios to transmission 232.

In some embodiments, electric generator 224 provides a torque load to turbine 220 that can be subsequently manipulated to affect the compressed gas pressures entering turbine 220 and which are monitored by pressure sensor and regulator 206. The torque load of electric generator 224 is affected by the electric load applied to it from electrolyzer 200, via electrical connection 260 between electrolyzer 200 and electrolyzer power regulator 238 and routed via 240. An optional additional electric load 242 to charge battery bank 244, via battery bank charger 246 and electrical connection 248, can also affect the electric load.

Electrolyzer power regulator 238 may include its own processing circuitry. Like control module 214, processing circuitry of electrolyzer power regulator 238 may be based on any suitable processing circuitry and comprises control circuits and memory circuits, which may be disposed on a single integrated circuit or may be discrete components.

The electrolyzer power regulator 238 monitors and controls the operational electric load requirements of the electrolyzer 200. It draws 240 electricity directly from electric generator 224, draws 254 electricity from battery bank 244, and draws 256 electricity from supplemental power 258

(e.g., a public utility power grid, solar array, wind turbine, etc.) depending on the availability of electricity at each source, and the electric generator 224 load command, transmitted over bi-directional data link 252, from the control module 214. Control module 214 thus monitors and manages the mechanical loads of the system, while electrolyzer power regulator 238 monitors and manages the electrical loads of the system. Electrolyzer power regulator 238 may draw electricity from more than one source simultaneously. For example, electric generator 224 or battery bank 244 may not be capable of providing all the electricity needed to drive electrolyzer 200. Electrolyzer power regulator 238 therefore draws power from both electric generator 224 (or battery bank 244) and supplemental power 258 simultaneously in order to provide the necessary electricity to electrolyzer 200. Electrolyzer power regulator 238 then transmits 260 the electricity to electrolyzer 200.

Electrolyzer power regulator 238 is connected to control module 214, electric generator 224, supplemental power 258, and optional battery bank charger 246 and its related battery bank 244. Electrolyzer power regulator 238 powers electrolyzer 200 as needed and sources electricity from electric generator 224, optional battery bank 244, and supplemental power 258 in that order of precedence. Electrolyzer power regulator 238 also controls the electric load demands on electric generator 224, which are requested by control module 214, by sourcing electricity directly from electric generator 224 or varying the charging load of battery bank charger 246.

Control module 214 may instruct 250 electrolyzer power regulator 238 to increase or decrease the torque load on the turbine 222. In some embodiments, control module 214 manages and maintains the compressed gas pressure by monitoring system pressures and adjusting turbine 222 torque load requests to electrolyzer power regulator 242, which subsequently adjusts the electric load on electric generator 226. In the event that pressure parameters are exceeded for the compress gas, and which cannot be influenced further by decreasing torque load for electric generator 226, the optional transmission 234 gear ratio, or optional variable pitch blades of turbine 222, then control module 214 signals to pressure sensor and regulator 206 to discharge pressure.

Control module 214 may also manage and maintain rotational speed of turbine 222 by monitoring revolutions per minute and adjusting either the optional transmission 234 gear ratio, optional variable pitch blades of turbine 222 or torque load requests to electrolyzer power regulator 242, which subsequently adjusts electric loads on electric generator 226. In the event that system parameters are exceeded for turbine speed, and which cannot be influenced further by torque load for electric generator 226, the optional transmission 234 gear ratio, or optional variable pitch blades of turbine 222, then control module 214 signals to pressure sensor and regulator 206 to discharge pressure.

Control module 214 manages the system to target compressed gas pressures that are greater than, or near to, the pressure of the surroundings within which the electrolyzer is located to in effect ensure that the various different pressures experienced by the electrolyzer, its internal components and separating membranes, do not exceed design parameters.

Figure 3:
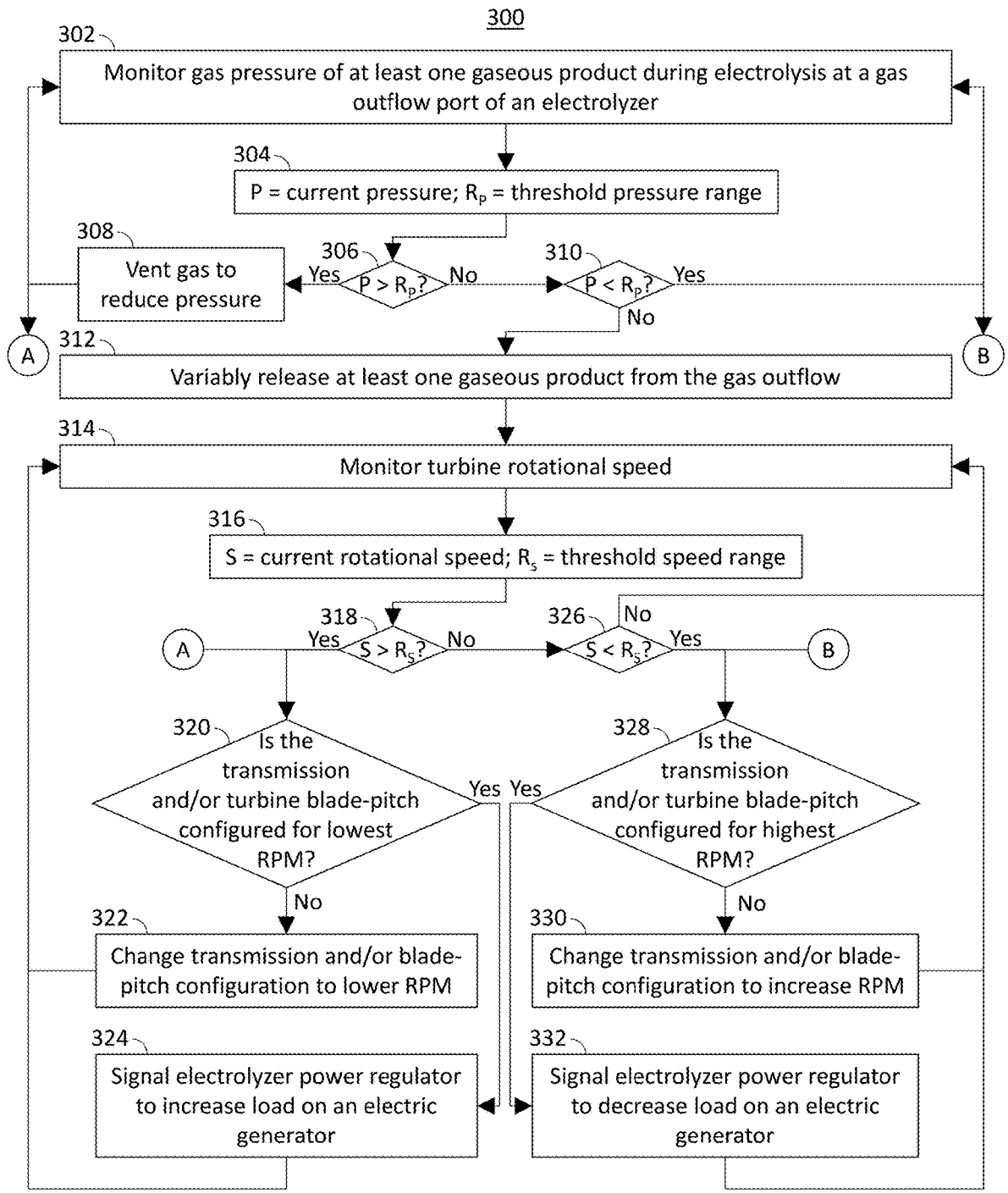
FIG. 3 is a flowchart representing an illustrative process for maintaining gas pressure in an electrolyzer through control of a gas outflow port and rotational speed of a turbine through which gases released from the outflow port will flow, in accordance with some embodiments of the disclosure.

FIG. 3 is a flowchart representing an illustrative process 300 for maintaining gas pressure in an electrolyzer through control of a gas outflow port and rotational speed of a turbine through which gases released from the outflow port will flow, in accordance with some embodiments of the disclosure. Process 300 may be implemented by control module 214. In addition, one or more actions of process 300 may be incorporated into or combined with one or more actions of any other process or embodiment described herein.

At 302, control module 214 monitors gas pressure of at least one gaseous product during electrolysis at a gas outflow port of the electrolyzer. For example, control module 214 may receive signals for a gas pressure sensor (e.g. pressure sensor and regulator 206). The signals received from the gas pressure sensor may be an analog signal (e.g., a voltage level) or a digital signal (e.g., a binary message). Control module 214 may process the signal to determine a gas pressure at the gas outflow port.

At 304, control module 214 sets the value of a variable P to the current pressure determined based on the signal from the pressure sensor, expressed in bar, atm, Torr, Pascal, psi, or any other suitable unit of pressure. In some embodiments, the pressure sensor may be designed or calibrated to report pressure readings in one unit of measurement which control module 214 may convert to a different unit of measurement. Control module 214 also initializes a variable $R_P$ representing a threshold pressure range. For example, $R_P$ may be an array or other data structure representing a minimum pressure and a maximum pressure. The minimum pressure may be 300 bar and the maximum pressure may be 500 bar.

At 306, control module 214 determines whether the current pressure P is above the threshold pressure range $R_P$. For example, control module 214 compares the value of P to the maximum of $R_P$ to determine if P exceeds $R_P$. If so ("Yes" at 306), then, at 308, control module 214 vents the gas to reduce the pressure. For example, control module 214 may signal a gas valve, such as a solenoid valve, to open and remain open until the pressure has been reduced to within the threshold pressure range $R_P$. In some embodiments, this action to taken directly by pressure sensor and regulator 206 in order to avoid processor delay or failure during a critical overpressure scenario. After venting the gas, processing returns to 302, where control module 214 continues to monitor gas pressure.

If the current pressure P does not exceed $R_P$ ("No" at 306), then, at 310, control module 214 determines whether P is below the threshold range of $R_P$. For example, control module 214 compares the value of P to the minimum of $R_P$ to determine if P is below $R_P$. If so ("Yes" at 310), then processing return to 302, where control module continues to monitor the gas pressure. If P is not below $R_P$ ("No" at 310), then P is determined to be within the threshold pressure range $R_P$. At 312, control module 214 variably releases at least one gaseous product from the gas outflow. For example, control module may open a value at the gas outflow by a variable amount to allow a specific volume of gas to escape, or to allow the gas to escape at a specific velocity. The gas is allowed to pas through the outflow port and into an outflow pipe which leads to a turbine.

At 314, control module 214 monitors a rotational speed of the turbine. For example, the turbine may include a tachometer or other sensor from which control module may determine a number of revolutions per minute at which the turbine is rotating. At 316, control module 214 sets the value of a variable S to the current rotational speed of the turbine. Control module 214 also initializes a variable $R_S$ representing a threshold speed range for rotation of the turbine. At 318, control module determines whether the current rotational speed of the turbine S exceeds the threshold speed range $R_S$. For example, control module 214 compares the value of S to the maximum value of $R_S$.

If S exceeds $R_S$ ("Yes" at 318), or after venting gas at 308, at 320, control module 214 determines whether the transmission and/or turbine blade-pitch are configured for the lowest rotational speed. For example, control module 214 may determine a gear ratio currently applied to the transmission and compare it with an available gear ratio that would result in the lowest rotational speed of the turbine. Control module 214 may also determine a pitch angle of the blades of the turbine and compare it with an available pitch angle that would result in the lowest rotational speed of the turbine. If either the transmission gear ratio or the pitch angle of the turbine blades can be adjusted to result in a lower rotational speed ("No" at 320), then, at 322, control module 214 changes the transmission gear ration and/or pitch angle of the turbine blades to a configuration that lowers the rotational speed of the turbine. Processing then returns to 314, where control module 214 continues to monitor rotational speed of the turbine.

If the transmission and the blade-pitch angle are both already configured for the lowest rotational speed of the turbine ("Yes" at 320), then, at 324, control module 214 signals the electrolyzer power regulator to increase load on the electric generator. Increasing the load on the electric generator will slow the rotation of the rotor of the electric generator, to which the output shaft of the turbine is connected, either directly or vie the transmission. Processing then returns to 314, where control module 214 continues to monitor rotational speed of the turbine.

If the current rotational speed of the turbine S does not exceed $R_S$ ("No" at 318), then, at 326, control module 214 determines whether S is below $R_S$. For example, control module 214 may compare the value of S with the minimum if $R_S$. If S is not below the minimum of $R_S$ ("No" at 326), then the rotational speed of the turbine is within the threshold speed range, and processing returns to 314, where control module 214 continues to monitor the rotational speed of the turbine.

If the rotational speed of the turbine is below $R_S$ ("Yes" at 326), then, at 328, control module 214 determines whether the transmission gear ratio or the pitch angle of the turbine blades are configured for the highest possible rotational speed of the turbine. For example, control module 214 may determine a gear ratio currently applied to the transmission and compare it with an available gear ratio that would result in the highest rotational speed. Control module 214 may also determine a current pitch angle of the turbine blades and compare it to an available pitch angle that would result in the highest rotational speed of the turbine. If either the transmission gear ratio or the pitch angle of the turbine blades can be adjusted to increase the rotational speed of the turbine ("No" at 328), then, at 330, control module 214 changes the transmission gear ratio and/or the pitch angle of the turbine blades to a configuration that will result in a higher rotational speed of the turbine. Processing then returns to 314, where control circuitry continues to monitor the rotational speed of the turbine.

If the transmission gear ratio and the pitch angle of the turbine blades are already configured for the highest rotation speed ("Yes" at 328), then, at 330, control module 214 signals the electrolyzer power regulator to decrease load on the electric generator, thereby increasing the speed at which the output shaft of the turbine can rotate. Processing then returns to 314, where control module 214 continues to monitor the rotational speed of the turbine.

In some embodiments, control module 214 continuously monitors gas pressure at the gas outflow port. After releasing the gas from the gas outflow to the turbine, control module 214 may monitor the pressure at the gas outflow port and close the port when the pressure reaches a minimum level. This will allow gas pressure to build up again to the point where outflow of the gas can be used to effectively rotate the turbine.

The actions or descriptions of FIG. 3 may be used with any other embodiment of this disclosure. In addition, the actions and descriptions described in relation to FIG. 3 may be done in any suitable alternative orders or in parallel to further the purposes of this disclosure.

Figure 4:
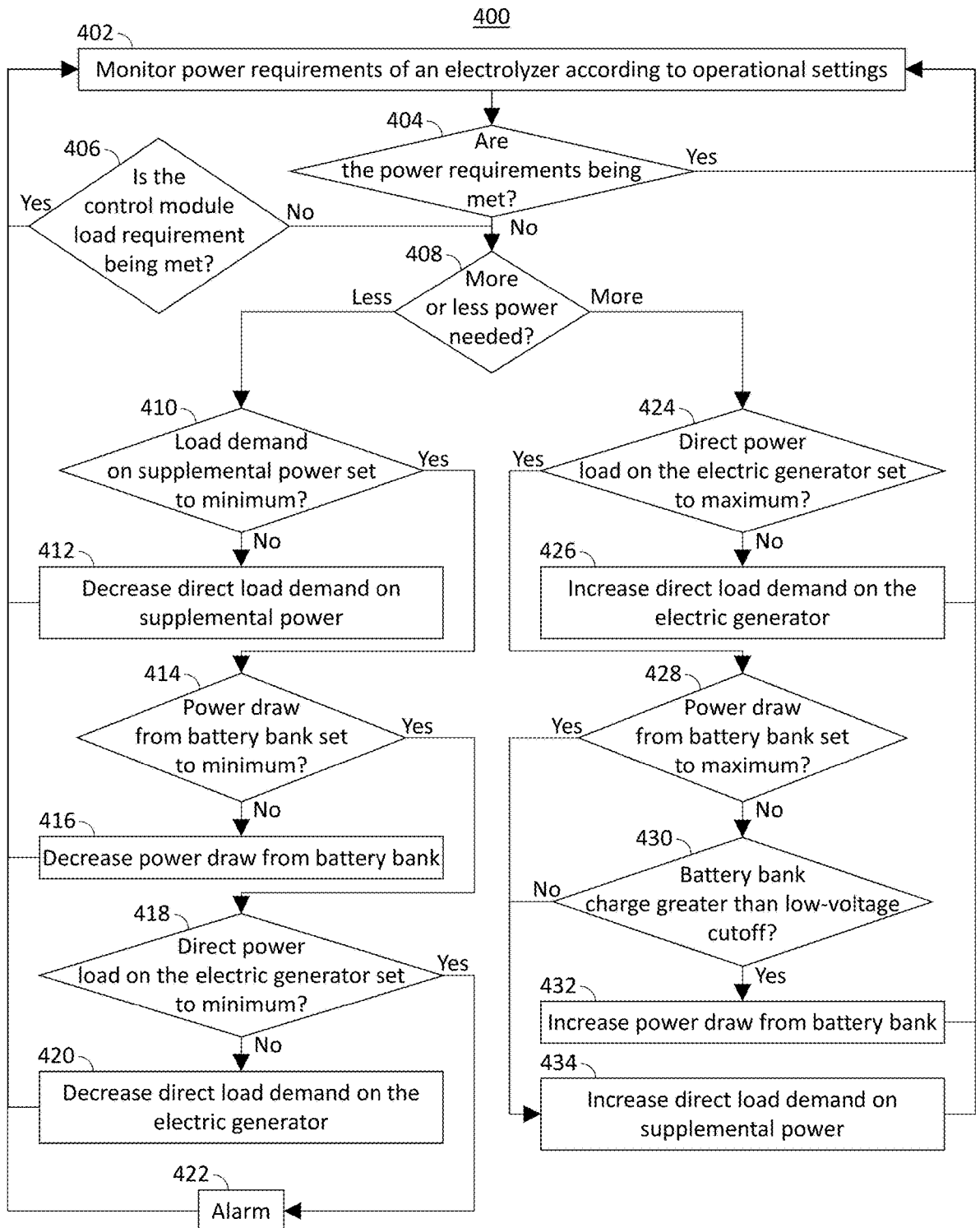
FIG. 4 is a flowchart representing an illustrative process for monitoring and controlling electric power flows in an electrolyzer, in accordance with some embodiments of the disclosure.

FIG. 4 is a flowchart representing an illustrative process 400 for monitoring and controlling electric power flows in an electrolyzer, in accordance with some embodiments of the disclosure. Process 400 may be implemented by electrolyzer power regulator 238. In addition, one or more actions of process 400 may be incorporated into or combined with one or more actions of any other process or embodiment described herein.

At 402, electrolyzer power regulator 238 monitors power requirements of the electrolyzer according to operational settings. An electrolyzer may be set by an operator or an operational management processor or other circuitry to meet certain performance metrics, including gas volume production per unit of time, electrical consumption per unit of time, or other metrics. To meet the performance metrics, different amounts of power may be needed by the electrolyzer. At 404, electrolyzer power regulator 238 determines whether the power requirements of the electrolyzer are being met. For example, electrolyzer power regulator 238 may detect, monitor, or otherwise determine an electrical current draw from the electrolyzer and compare it with an amount of electrical current being provided by electrolyzer power regulator 238 to the electrolyzer from one or more power sources. If the power requirement are being met ("Yes" at 404), then processing returns to 402, where electrolyzer power regulator 238 continues to monitor the power requirements of the electrolyzer.

In some embodiments, electrolyzer power regulator 238 also determines, at 406, whether the load requirement of control module 214 is being met. For example, electrolyzer power regulator 238 may communicate with control module 214 and receive signals indicating whether the load requirement is met or not. For example, control module 214 may determine that a reduced electrical load on the electric generator is required. If so ("Yes" at 406), then electrolyzer power regulator continues monitoring the power requirements of the electrolyzer. If the load requirements of the control module are not being met ("No" at 406), or if the power requirements of the electrolyzer are being met ("No" at 404), then, at 406, electrolyzer power regulator 238 determines whether more or less power is needed by the electrolyzer. For example, electrolyzer power regulator 238 may determine whether the amount of current being drawn by the electrolyzer exceeds the amount of current being provided by electrolyzer power regulator 238, or if electrolyzer power regulator 238 is providing more electrical current than is being drawn by the electrolyzer.

If less current than is needed by the electrolyzer is currently being provided ("Less" at 408), then, at 410, electrolyzer power regulator 238 determines whether a load demand on a supplemental power source is set to a minimum load. For example, electrolyzer power regulator 238 may be configured to draw power from the electric generator connected to the turbine, a batter bank, and at least one supplemental power source, such as a solar panel or a public utility power grid. Electrolyzer power regulator may be configured to draw power from each of these sources in decreasing order of preference, with the supplemental power source being the lowest preference. Thus, if less power is needed, electrolyzer power regulator 238 first determines whether power is being drawn from the supplemental power source. If so, then it is possible to decrease the power drawn from that source. Therefore, the load demand is not at a minimum ("No" at 410) and, at 412, electrolyzer power regulator 238 decreased the direct load demand on the supplemental power source. This results in less power being drawn from the supplemental power source, and therefore less power being provided to the electrolyzer. After decreasing the load demand on the supplemental power source, processing returns to 402, where electrolyzer power regulator 238 continues to monitor the power requirements of the electrolyzer.

If further power reduction is needed, and the load demand on the supplemental power source is already at a minimum ("Yes" at 410), then, at 414, electrolyzer power regulator 238 determines whether power draw from the battery bank is set to a minimum. This may be accomplished using methods similar to those described above in connection with step 410. If the power draw from the battery bank is not set to a minimum ("No" at 414, then, at 416, electrolyzer power regulator 238 decreases power draw from the battery bank, thereby reducing the amount of power available for the electrolyzer. Processing then returns to 402, where electrolyzer power regulator 238 continues to monitor power requirements of the electrolyzer.

If further power reduction is needed, and the load demand on both the supplemental power source and the battery bank are already at a minimum ("Yes" at 414), then, at 418, electrolyzer power regulator 238 determines whether direct power load on the electric generator is set to a minimum. Again, this may be accomplished using methods similar to those described above in connection with step 410. If the direct power load on the electric generator is not at a minimum ("No" at 418), then, at 420, electrolyzer power regulator 238 decreases the direct load demand on the electric generator, thereby reducing the amount of power available for the electrolyzer.

If the direct power load on the electric generator is set to minimum ("Yes" at 418), then, at 422, electrolyzer power regulator 238 issues an alarm to warn an operator of the electrolyzer that the amount of electrical power available to the electrolyzer cannot be further reduced at the current time. Processing then returns to 402, where electrolyzer power regulator continues to monitor power requirements of the electrolyzer.

If more current than is needed by the electrolyzer is currently being provided ("More" at 408), then, at 424, electrolyzer power regulator 238 determines whether the direct load on the electric generator is set to a maximum. This may be accomplished using methods similar to those described above in connection with step 410. If the direct load on the electric generator is not at a maximum ("No" at 424), then, at 426, electrolyzer power regulator 238 increases direct load on the electric generator, thereby making additional electrical power available to the electrolyzer. Processing then returns to 402, where electrolyzer power regulator continues to monitor power requirements of the electrolyzer.

If the direct power load on the electric generator is at a maximum ("Yes" at 424), then, at 428, electrolyzer power regulator 238 determines whether the power draw from the battery bank charging is set to a maximum. This may be accomplished using methods similar to those described above in connection with step 410. If the power draw from the battery bank is not set to a maximum ("No" at 428), then, at 430, electrolyzer power regulator 238 determines whether the battery bank charge is greater than a low-voltage cutoff. For rechargeable batteries, there is a minimum voltage required to be maintained in each cell in order to the battery to function properly. Overdrawing from the batteries may result in damage to one or more cells. Electrolyzer power regulator 238 may communicate with a battery bank charger to determine a voltage in each cell. If the charge is greater than the low-voltage cutoff ("Yes" at 430) then, at 432, electrolyzer power regulator 238 increases the battery bank charge setting. This results in additional power being available to the electrolyzer. Processing then returns to 402, where electrolyzer power regulator continues to monitor power requirements of the electrolyzer.

If the power draw from the battery bank is already set to a maximum power draw ("Yes" at 428) and the battery bank charge is at or below the low-voltage cutoff ("No" at 430), then, at 434, electrolyzer power regulator 238 increases direct load demand on the supplemental power. This makes more power from the supplemental power source(s) available to the electrolyzer. Processing then returns to 402, where electrolyzer power regulator 238 continues to monitor power requirements of the electrolyzer.

Using the above steps, electrolyzer power regulator 238 continuously balances power utilization by the electrolyzer from each of the available power sources. In some embodiments, electrolyzer power regulator 238 also continuously balances use of electrical power generated by the electrical generator. For example, the charging load of the battery bank may also be controlled in order to make more or less power available for the electrolyzer. In some cases, a battery bank charger may be configured to operate in different power consumptions modes, such as a low-power mode, a trickle charge mode, or may be charging a subset of battery cells in the battery bank. In a maximum charging mode, the battery bank charger may draw higher current and/or charge more cells simultaneously. If the battery bank charging is not set to a maximum charging load, then the battery bank charger increases the battery bank charge setting. For example, the battery bank charger may begin operating in a higher power consumption mode. This draws additional power from the available source of power, thereby reducing the amount of power available to the electrolyzer. Similarly, to increase the amount of power available to the electrolyzer, the battery bank charger may begin operating in a lower power mode.

The actions or descriptions of FIG. 4 may be used with any other embodiment of this disclosure. In addition, the actions and descriptions described in relation to FIG. 4 may be done in any suitable alternative orders or in parallel to further the purposes of this disclosure.

The above descriptions are detailed to enable those skilled in the art to practice the invention, and the embodiments published herein merely exemplify the present device and do not limit the scope of any claims appended hereto.

What is claimed is:

1. An energy capturing apparatus to generate electricity from gases produced during electrolysis, the apparatus comprising:
   a rotatable member positioned downstream from a gas outflow port of an electrolyzer and mechanically coupled to an electric generator, the rotatable member configured to rotate in response to gas released from the electrolyzer, wherein the rotation causes the electric generator to produce electricity;
   a pressure regulator configured to control the pressure of at least one gaseous product during electrolysis and positioned between the gas outflow port and the rotatable member;

a power regulator configured to manage power from the electric generator and at least one external power source;
control circuitry configured to:
monitor gas pressure of the at least one gaseous product within the electrolyzer; and
control a rotation speed of the rotatable member; and
a transmission having a plurality available of gear ratios, the transmission being interposed between the rotatable member and the electric generator;
wherein the control circuitry is further configured to select a gear ratio of the plurality of available gear ratios; and apply the selected gear ratio to the transmission.

2. The apparatus of claim 1, wherein the rotatable member comprises a fan.

3. The apparatus of claim 1, wherein the rotatable member comprises a turbine.

4. The apparatus of claim 1, wherein
the rotatable member further comprises a plurality of adjustable blades; and
the control circuitry is further configured to control an angle of the plurality of adjustable blades relative to a plane perpendicular to an axis of rotation of the rotatable member.

5. The apparatus of claim 1, wherein the power regulator is further configured to transmit electricity from both the electric generator and the external power source to the electrolyzer simultaneously.

6. The apparatus of claim 1, further comprising:
a battery bank comprising one or more batteries; and
a battery bank charger.

7. The apparatus of claim 6, wherein the power regulator is further configured to:
selectably transmit electricity from electric generator to the battery bank charger or the electrolyzer; and
selectably transmit electricity from the at least one external power source to the battery bank charger or the electrolyzer.

8. The apparatus of claim 1, further comprising:
at least one additional rotatable member positioned downstream of the rotatable member and being mechanically coupled to an additional electric generator,
wherein the additional electric generator is electrically coupled to the electric generator in series.

9. The apparatus of claim 8, wherein the control circuitry is further configured to control the at least one additional rotatable member.

10. A method for capturing energy to generate electricity from gases produced during electrolysis, the method comprising:
monitoring gas pressure of at least one gaseous product during electrolysis at a gas outflow port of an electrolyzer;
in response to determining that the gas pressure of the at least one gaseous product has reached a threshold pressure, releasing the at least one gaseous product from the gas outflow port;
capturing kinetic energy of the at least one gaseous product using a rotatable member positioned downstream from the gas outflow port and mechanically coupled to an electric generator, the rotatable member configured to rotate in response to gas released from the electrolyzer, wherein the rotation causes the electric generator to produce electricity;
selecting a gear ratio of a transmission interposed between the rotatable member and the electric generator, the transmission having a plurality of available gear ratios;
applying the selected gear ratio to the transmission; and
managing power from the electric generator and at least one external power source to provide electricity to the electrolyzer.

11. The method of claim 10, wherein the rotatable member comprises a fan.

12. The method of claim 10, wherein the rotatable member comprises a turbine.

13. The method of claim 10, wherein the rotatable member further comprises a plurality of adjustable blades, the method further comprising:
controlling an angle of the plurality of adjustable blades relative to a plane perpendicular to an axis of rotation of the rotatable member.

14. The method of claim 10, wherein further comprising transmitting electricity from both the electric generator and the external power source to the electrolyzer simultaneously.

15. The method of claim 10, further comprising:
transmitting electricity from the electric generator to a battery bank comprising one or more batteries; and
charging the one or more batteries.

16. The method of claim 15, further comprising:
selectably transmitting electricity from electric generator to the battery bank or the electrolyzer; and
selectably transmitting electricity from the at least one external power source to the battery bank charger or the electrolyzer.

17. The method of claim 10, wherein:
at least one additional rotatable member is positioned downstream of the rotatable member and being mechanically coupled to an additional electric generator; and
the additional electric generator is electrically coupled to the electric generator in series.

18. The method of claim 17, wherein further comprising controlling the at least one additional rotatable member.

19. An energy capturing apparatus to generate electricity from gases produced during electrolysis, the apparatus comprising:
a rotatable member positioned downstream from a gas outflow port of an electrolyzer and mechanically coupled to an electric generator, the rotatable member includes a plurality of adjustable blades and is configured to rotate in response to gas released from the electrolyzer, wherein the rotation causes the electric generator to produce electricity;
a pressure regulator configured to control the pressure of at least one gaseous product during electrolysis and positioned between the gas outflow port and the rotatable member;
a power regulator configured to manage power from the electric generator and at least one external power source; and
control circuitry configured to:
monitor gas pressure of the at least one gaseous product within the electrolyzer; and
control a rotation speed of the rotatable member; and
control an angle of the plurality of adjustable blades relative to a plane perpendicular to an axis of rotation of the rotatable member.

* * * * *